(12) United States Patent
Dai et al.

(10) Patent No.: US 12,383,859 B2
(45) Date of Patent: Aug. 12, 2025

(54) VOC TREATMENT ROTOR SYSTEM AND VOC TREATMENT METHOD

(71) Applicant: JIANGSU SUJING GROUP CO., LTD., Jiangsu (CN)

(72) Inventors: Ming Dai, Jiangsu (CN); Weiqiang Zhi, Jiangsu (CN)

(73) Assignee: JIANGSU SUJING GROUP CO., LTD., Suzhou (CN)

( * ) Notice: Subject to any disclaimer, the term of this patent is extended or adjusted under 35 U.S.C. 154(b) by 271 days.

(21) Appl. No.: 18/042,995

(22) PCT Filed: Aug. 30, 2021

(86) PCT No.: PCT/CN2021/115264
§ 371 (c)(1),
(2) Date: Feb. 24, 2023

(87) PCT Pub. No.: WO2022/142424
PCT Pub. Date: Jul. 7, 2022

(65) Prior Publication Data
US 2023/0356142 A1 Nov. 9, 2023

(30) Foreign Application Priority Data
Dec. 30, 2020 (CN) .............. 202011607607

(51) Int. Cl.
*B01D 53/06* (2006.01)
*B01D 53/08* (2006.01)
(Continued)

(52) U.S. Cl.
CPC .............. *B01D 53/08* (2013.01); *F23G 7/07* (2013.01); *B01D 2257/708* (2013.01); *B01D 2259/4009* (2013.01); *B01D 2259/402* (2013.01)

(58) Field of Classification Search
CPC ........ B01D 53/04; B01D 53/06; B01D 53/08; B01D 2257/708; B01D 2259/4009; B01D 2259/402; Y02A 50/20; F23G 7/07
(Continued)

(56) References Cited

U.S. PATENT DOCUMENTS 5,242,473 A * 9/1993 Ogasahara ............. B01D 53/06
96/125
5,512,083 A * 4/1996 Dunne ................... B01D 53/06
95/143
(Continued)

FOREIGN PATENT DOCUMENTS

| CN | 209333523 U | 9/2019 |
|---|---|---|
| CN | 209490654 U | 10/2019 |

(Continued)

OTHER PUBLICATIONS

International Search Report and Written Opinion issued for International Patent Application No. PCT/CN2021/115264, dated Dec. 1, 2021 in 12 pages.

*Primary Examiner* — Frank M Lawrence, Jr.
(74) *Attorney, Agent, or Firm* — Knobbe, Martens, Olson & Bear, LLP

(57) ABSTRACT

Disclosed are a VOC treatment rotor system and a VOC treatment method. The system comprises: a rotor having a first adsorption zone and a second adsorption zone; a gas intake pipeline communicated with an inlet of the first adsorption zone; a gas outlet pipeline comprising a gas outlet main pipe, a gas outlet branch pipe and a first clean gas outlet pipe; a second clean gas outlet pipe, communicated with an outlet of the second adsorption zone. The treatment method comprises: making VOC-containing waste gas enter the first adsorption zone through the gas intake pipeline for adsorption treatment by the first adsorption zone, then enter the gas outlet main pipe, and then enter
(Continued)

the second adsorption zone through the gas outlet branch pipe or be discharged from the first clean gas outlet pipe.

11 Claims, 1 Drawing Sheet

(51) Int. Cl.
    *B01D 53/86*          (2006.01)
    *F23G 7/07*           (2006.01)

(58) Field of Classification Search
    USPC .... 95/113–115, 141; 96/125, 126, 130, 134, 96/146
    See application file for complete search history.

(56) References Cited

U.S. PATENT DOCUMENTS

| | | | |
|---|---|---|---|
| 2016/0175772 A1* | 6/2016 | Maruyama | B01D 53/62 422/180 |
| 2016/0271556 A1 | 9/2016 | Okano | |

FOREIGN PATENT DOCUMENTS

| | | |
|---|---|---|
| CN | 209985157 U | 1/2020 |
| CN | 112755726 A | 5/2021 |
| CN | 214261285 U | 9/2021 |
| JP | H09187621 A | 7/1997 |
| JP | 2006-035188 A | 2/2006 |

* cited by examiner

VOC TREATMENT ROTOR SYSTEM AND VOC TREATMENT METHOD

CROSS-REFERENCE TO RELATED APPLICATIONS

This application is the U.S. National Phase under 35. U.S.C. § 371 of International Application PCT/CN2021/115264, filed Aug. 30, 2021, which claims priority to Chinese Patent Application No. 202011607607.8, filed Dec. 30, 2020. The disclosures of the above-described applications are hereby incorporated by reference in their entirety.

TECHNICAL FIELD OF THE INVENTION

The present disclosure belongs to the technical field of gas treatment, in particular to the treatment of volatile organic compounds (VOCs for short), and in particular to a VOC treatment rotor system and a VOC treatment method.

BACKGROUND OF THE INVENTION

Volatile organic compounds (VOCs for short) are widely derived from the fields of petrochemical industry, pharmacy, printing, paint decoration, transportation and the like. VOCs are generally toxic and harmful to the environment, and when the concentration of VOCs reaches a certain concentration, it will stimulate the human respiratory tract and seriously affect people's lives. At present, rotors are used to adsorb VOCs to achieve the purpose of purifying the air, and in order to meet the treatment requirements and ensure that the VOC content in the purified gas reaches the preset value, two or more rotors are often required to treat the gas multiple times, and the treating process is complicated. Moreover, when the rotors reach the adsorption limit, they usually need to be stopped for replacement or desorption, and even more spare rotors need to be prepared, which is not conducive to practical applications.

SUMMARY OF THE INVENTION

The present disclosure is aimed to overcome the deficiencies in the prior art, and provide a new type of VOC treatment rotor system, which can achieve effective and multi-level removal of VOC through one rotor, with high treatment efficiency and simpler treating process.

To achieve the above purposes, a technical solution employed by the present disclosure is:
a VOC treatment rotor system, which comprises:
 a rotor having a first adsorption zone and a second adsorption zone which are arranged in sequence along the circumferential direction thereof and are independent of each other;
 a gas intake pipeline communicated with an inlet of the first adsorption zone;
 a gas outlet pipeline comprising a gas outlet main pipe, a gas outlet branch pipe and a first clean gas outlet pipe, an inlet of the gas outlet main pipe is communicated with an outlet of the first adsorption zone, an outlet of the gas outlet main pipe is respectively communicated with an inlet of the gas outlet branch pipe and an inlet of the first clean gas outlet pipe; an outlet of the gas outlet branch pipe is communicated with an inlet of the second adsorption zone;
 a second clean gas outlet pipe communicated with an outlet of the second adsorption zone.

According to some preferred aspects of the present disclosure, the VOC treatment rotor system further comprises a VOC content detection device for detecting the VOC content in the gas flowing through the gas outlet main pipe, and the VOC content detection device is arranged on the gas outlet main pipe.

According to some preferred aspects of the present disclosure, the rotor further comprises a first desorption zone arranged along the circumferential direction thereof and in sequence with the second adsorption zone, and a second desorption zone located between the first desorption zone and the first adsorption zone, and the first desorption zone and the second desorption zone are arranged independently of each other.

According to some preferred aspects of the present disclosure, the VOC treatment rotor system further comprises a heater for heating regeneration gas, and an outlet of the heater is communicated with an inlet of the first desorption zone and an inlet of the second desorption zone, respectively.

According to some preferred aspects of the present disclosure, the VOC treatment rotor system further comprises:
 a first circulation pipeline, an inlet of the first circulation pipeline is communicated with an outlet of the second desorption zone, and an outlet of the first circulation pipeline is communicated with the gas intake pipeline;
 a first concentration pipeline, an inlet of the first concentration pipeline is communicated with an outlet of the first desorption zone;
 a second concentration pipeline, an outlet of the first concentration pipeline is communicated with the second concentration pipeline; an inlet of the second concentration pipeline is communicated with another outlet of the second desorption zone;
 a catalytic combustion mechanism, an outlet of the second concentration pipe is communicated with an inlet of the catalytic combustion mechanism.

According to some preferred aspects of the present disclosure, the VOC treatment rotor system further comprises:
 a second circulation pipeline, an inlet of the second circulation pipeline is communicated with an outlet of the catalytic combustion mechanism, and an outlet of the second circulation pipeline is communicated with an inlet of the heater.

According to some preferred aspects of the present disclosure, the VOC treatment rotor system further comprises:
 a casing having a chamber and end caps located at both ends of the chamber, and the rotor is rotatably arranged on the casing and partially or completely located within the chamber.

The present disclosure provides yet another technical solution: a VOC treatment method, which is carried out by using the above-mentioned VOC treatment rotor system, and the treatment method comprises: making VOC-containing waste gas enter the first adsorption zone through the gas intake pipeline for adsorption treatment by the first adsorption zone, then enter the gas outlet main pipe, and then enter the second adsorption zone through the gas outlet branch pipe or be discharged from the first clean gas outlet pipe; wherein, detect the VOC content in the gas entering the gas outlet main pipe using the VOC content detection device, and if the VOC content is less than or equal to the preset value, connect the gas outlet main pipe to the first clean gas outlet pipe and discharge the gas after adsorption treatment from the first clean gas outlet pipe; if the VOC content is greater than the preset value, connect the gas outlet main pipe to the gas outlet branch pipe, and discharge the gas after adsorption treatment by the second adsorption zone from the second clean gas outlet pipe.

According to some preferred aspects of the present disclosure, the treatment method further comprises:

adjusting the rotor to change the first adsorption zone to the first desorption zone, and change the second adsorption zone to the second desorption zone;

heating the regeneration gas flowing through the first desorption zone and the second desorption zone by the heater to perform desorption regeneration on the first desorption zone and the second desorption zone;

making part of the gas flow passing through the second desorption zone to pass through the first circulation pipeline which is communicated with the gas intake pipeline, so as to be recirculated into the first adsorption zone;

making another part of the gas flow passing through the second desorption zone to enter the second concentration pipeline;

making the gas flow passing through the first desorption zone to pass through the first concentration pipeline and enter the second concentration pipeline;

making the gas flow in the second concentration pipeline to communicate with the catalytic combustion mechanism;

performing catalytic combustion of the gas flow through the catalytic combustion mechanism.

In the present disclosure, "independent of each other" means that they can work independently without interfering with each other, but they also can be communicate with each other and work together, such as sequentially treating VOC-containing waste gas.

Due to the use of the above technical solutions, the present disclosure has the following advantages over the prior art:

Based on that in the prior art, in order to ensure that the VOC content in the purified gas reaches a preset value, two rotors are often required to process the gas for multiple times, and the treatment process is complicated, the present disclosure innovatively provides a new type of VOC treatment rotor system, the system divides the area on a rotor, specifically divides it into two adsorption zones, and if the VOC content in the gas after passing through the first adsorption zone still exceeds the preset value, it can be further absorbed and taken out through the second adsorption area, which does not need two rotors to meet the demand. The adsorption process is completed in one rotor, and two desorption zones arranged in the circumferential direction can be added at the same time, which can realize the effective switching of desorption and adsorption of the rotor, avoid operations such as disassembly and replacement, and improve the VOC treatment capacity of the entire system, and can achieve effective and multi-level removal of VOC through one rotor, with high treatment efficiency and simpler treatment process.

BRIEF DESCRIPTION OF THE DRAWINGS

For more clearly explaining the technical solutions in the embodiments of the present disclosure or the prior art, the accompanying drawings used to describe the embodiments or the prior art are simply introduced in the following. Apparently, the below described drawings merely show a part of the embodiments of the present disclosure, and those skilled in the art can obtain other drawings according to the accompanying drawings without creative work.

Figure 1:
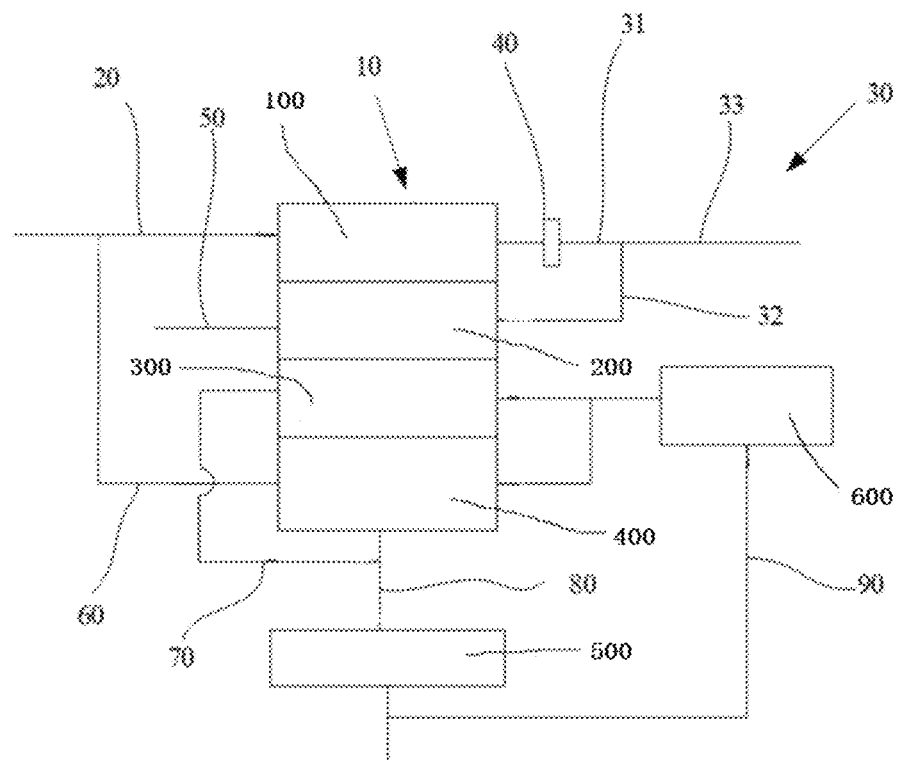
FIG. 1 is a schematic structural diagram of a VOC treatment rotor system according to an embodiment of the present disclosure.

Wherein, 100, first adsorption zone; 200, second adsorption zone; 300, first desorption zone; 400, second desorption zone; 500, catalytic combustion mechanism; 600, heater; 10, rotor; 20, gas intake pipeline; 30, gas outlet pipeline; 31, gas outlet main pipe; 32, gas outlet branch pipe; 33, first clean gas outlet pipe; 40, VOC content detection device; 50, second clean gas outlet pipe; 60, first circulation pipeline; 70, first concentration pipeline; 80, second concentration pipeline; 90, second circulation pipeline.

DETAILED DESCRIPTION OF EXEMPLARY EMBODIMENTS

In order to make the above objects, features and advantages of the present disclosure more clearly understood, the present disclosure will be described in detail below with reference to the accompanying drawings and specific embodiments. In the following description, numerous specific details are set forth in order to provide a thorough understanding of the present disclosure. However, the present disclosure can be implemented in many other ways different from those described herein, and those skilled in the art can make similar improvements without departing from the connotation of the present disclosure, therefore, the present disclosure is not limited by the specific embodiments disclosed below.

In the description of the present disclosure, "a plurality of" means at least two, such as two, three, etc., unless otherwise expressly and specifically defined. In the present disclosure, unless otherwise expressly specified and limited, the terms "mount", "communicate", "connect", "fix" and other terms should be understood in a broad sense, for example, it may be fixedly connected or detachably connected, or integrated; it may be mechanically connected or electrically connected; it can be directly connected or indirectly connected through an intermediate medium, or it can be the internal communication of two elements or the interaction relationship between two elements, unless otherwise specified limit. For those of ordinary skill in the art, the specific meanings of the above terms in the present disclosure can be understood according to specific situations.

In the disclosure, unless otherwise expressly specified and limited, a first feature "on" or "under" a second feature may mean that the first feature is in direct contact with the second feature, or the first feature is in indirect contact with the second feature through an intermediate medium. Also, the first feature being "above", "over" the second feature may mean that the first feature is directly above or obliquely above the second feature, or simply means that the first feature is level higher than the second feature. The first feature being "under", "below" and "underneath" the second feature may mean that the first feature is directly below or obliquely below the second feature, or simply means that the first feature has a lower level than the second feature.

It should be noted that when an element is referred to as being "fixed to" or "arranged on" another element, it can be directly on the other element or intervening elements may also be present. When an element is referred to as being "connected to" another element, it can be directly connected to the other element or intervening elements may also be present.

Figure 2:
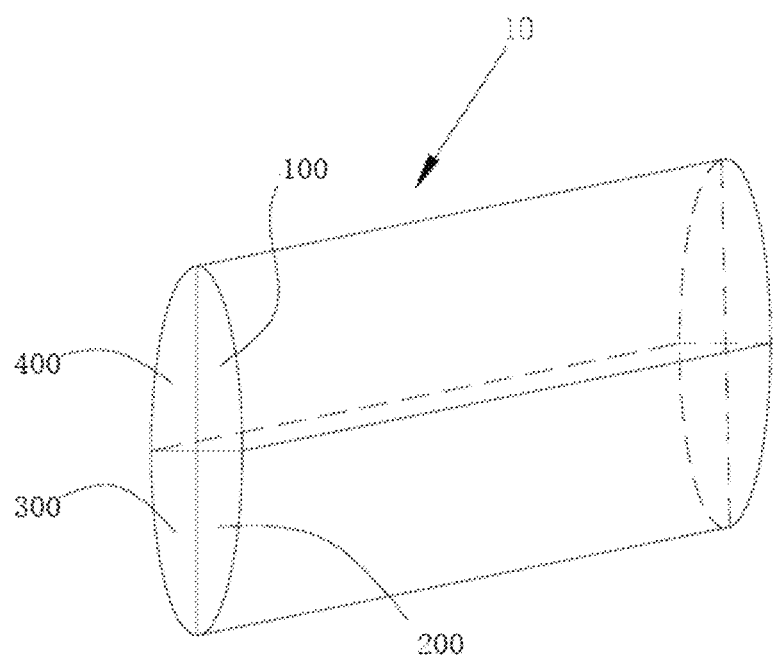
FIG. 2 is a schematic diagram of the arrangement of the first adsorption zone, the second adsorption zone, the first desorption zone and the second desorption zone on the rotor respectively along its circumferential direction in an embodiment of the present disclosure.

In the following, the preferred embodiments of the present disclosure are explained in detail combining with the accompanying drawings. As shown in FIG. 1 to FIG. 2, this embodiment provides a VOC treatment rotor system, the VOC treatment rotor system comprises: a rotor 10, a gas intake pipeline 20, a gas outlet pipeline 30 and a second clean gas outlet pipe 50.

Specifically, the rotor 10 has a first adsorption zone 100 and a second adsorption zone 200 which are arranged in sequence along the circumferential direction thereof and are independent of each other, and each extending in the axial direction; and the function of the adsorption zones is to adsorb VOC substances existing in the gas flowing through them; the gas intake pipeline 20 is communicated with an inlet of the first adsorption zone 100; the gas outlet pipeline 30 comprises a gas outlet main pipe 31, a gas outlet branch pipe 32 and a first clean gas outlet pipe 33; an inlet of the gas outlet main pipe 31 is communicated with an outlet of the first adsorption zone 100, an outlet of the gas outlet main pipe 31 is respectively communicated with an inlet of the gas outlet branch pipe 32 and an inlet of the first clean gas outlet pipe 33; an outlet of the gas outlet branch pipe 32 is communicated with an inlet of the second adsorption zone 200; the second clean gas outlet pipe 50 is communicated with an outlet of the second adsorption zone 200.

As shown in FIG. 1, the polluted gas to be treated enters the first adsorption zone 100 through the gas intake pipeline 20, and VOCs are absorbed by the first adsorption zone 100. If the VOC content of the gas treated by the first adsorption zone 100 does not exceed the preset value, the gas can be directly discharged from the first clean gas outlet pipe 33. If the VOC content of the gas treated by the first adsorption zone 100 exceeds the preset value, the gas can enter the second adsorption zone 200 through the outlet branch pipe 32 for further treatment. From this, it can be seen that whether the second adsorption zone 200 is used can be selected according to needs. The VOC concentration at the outlet of the second adsorption zone 200 is lower than the VOC concentration at the outlet of the first adsorbent zone.

In this embodiment, by dividing two adsorption zones on one rotor 10, if the VOC content in the gas after passing through the first adsorption zone 100 still exceeds the preset value, the VOCs can be further adsorbed and removed through the second adsorption zone 200, which can meet the requirements without two or even more independent rotors 10, improve the VOC treating capacity of the entire system, and can remove VOCs in a hierarchical manner, while avoiding the combined installation of a plurality of separate rotors, especially reducing the switching operation between two or even more independent rotors 10.

In this embodiment, the VOC treatment rotor system further comprises: a VOC content detection device 40 for detecting the VOC content in the gas flowing through the gas outlet main pipe 31, which is arranged on the gas outlet main pipe 31. The VOC concentration of the gas flowing out of the gas outlet main pipe 31 can be detected by the VOC content detection device 40.

Further, the VOC treatment rotor system further comprises a control module and a valve, the valve is located at the inlets of the gas outlet branch pipe 32 and the first clean gas outlet pipe 33, and is electrically connected to the control module, and the VOC content detection device 40 is further electrically connected to the control module. The VOC content detection device 40 sends a detected VOC concentration signal of the gas to the control module, and the control module controls the valve to communicate with the gas outlet branch pipe 32 or the first clean gas outlet pipe 33 according to the VOC concentration signal.

In this embodiment, the rotor 10 further comprises: a first desorption zone 300 arranged along the circumferential direction thereof and in sequence with the second adsorption zone 200, and a second desorption zone 400 located between the first desorption zone 300 and the first adsorption zone 100, and the first desorption zone 300 and the second desorption zone 400 are arranged independently of each other, the desorption zones essentially refer to the areas in which the VOC substances have been adsorbed, that is, they are adsorption zones in the early stage, but after the adsorption of VOC substances, the adsorption capacity decreases or it is difficult to continue the adsorption, and at this time, a desorption operation is required, so they become desorption zones, the desorption operation refers to the removal of the adsorbed VOC substances to regenerate the ability to adsorb VOCs, and high temperature desorption and the like can be used for desorption. Wherein, the arrangement of the first adsorption zone 100, the second adsorption zone 200, the first desorption zone 300 and the second desorption zone 400 on the rotor 10 respectively along its circumferential direction is as shown in FIG. 2.

In this embodiment, the VOC treatment rotor system further comprises: a heater 600 for heating regeneration gas, and an outlet of the heater 600 is communicated with an inlet of the first desorption zone 300 and an inlet of the second desorption zone 400, respectively.

In this embodiment, the VOC treatment rotor system further comprises: a first circulation pipeline 60, an inlet of the first circulation pipeline 60 is communicated with an outlet of the second desorption zone 400, and an outlet of the first circulation pipeline 60 is communicated with the gas intake pipeline 20; a first concentration pipeline 70, an inlet of the first concentration pipeline 70 is communicated with an outlet of the first desorption zone 300; a second concentration pipeline 80, an outlet of the first concentration pipeline 70 is communicated with the second concentration pipeline 80; an inlet of the second concentration pipeline 80 is communicated with another outlet of the second desorption zone 400; a catalytic combustion mechanism 500, an outlet of the second concentration pipeline 80 is communicated with an inlet of the catalytic combustion mechanism 500.

As shown in FIG. 1, part of the gas treated by the second desorption zone 400 (the gas is the gas generated by the desorption operation, for example, a mixed gas formed after the passing gas takes away the adsorbed VOC when the high-temperature gas desorption is used) enters the catalytic combustion mechanism 500 for catalytic combustion, and the VOCs is burned into non-polluting gases such as carbon dioxide and water. The other part enters the gas intake pipeline 20 from the first circulation pipeline 60, and then enters the first adsorption zone 100 for circulation. It can be understood that the VOC content in the gas treated by the second desorption zone 400 is lower than the VOC content in the polluted gas to be treated, and mixing the two can reduce the treating pressure of the first adsorption zone 100 and ensure the adsorption effect on VOCs.

Generally, the catalytic combustion mechanism 500 comprises a combustion device and a catalytic device, wherein the combustion device is used for burning VOCs, and the catalytic device comprises a catalyst for further catalytically decomposing the VOCs.

The heater 600 heats the air flow, and after the hot air flows through the first desorption zone 300 and the second desorption zone 400, the VOCs in the first desorption zone 300 and the second desorption zone 400 can be taken away, to regenerate the first desorption zone 300 and the second desorption zone 400, and transform them into a new first adsorption zone 100 and second adsorption zone 200, and in this cycle, the integration of adsorption and desorption is realized, and the desorption operation can be realized in the process of adsorption, which saves time, and can be carried out without stopping the machine, which is beneficial to industrial applications.

In this embodiment, the VOC treatment rotor system further comprises: a second circulation pipeline 90, an inlet of the second circulation pipeline 90 is communicated with an outlet of the catalytic combustion mechanism 500, and an outlet of the second circulation pipeline 90 is communicated with an inlet of the heater 600.

As shown in FIG. 1, the second circulation pipeline 90 can circulate part of the gas generated after catalytic combustion into the heater 600, and for the circulation gas flowing out of the catalytic combustion mechanism 500, not only VOCs are basically removed, but also its temperature is relatively high, and it circulates into the first desorption zone 300 and the second desorption zone 400 to regenerate the rotor 10, and the waste heat in the airflow is also reused at the same time, which reduces the burden on the heater 600, reduces the energy consumption of the heater 600, and is conducive to saving energy.

In this embodiment, the VOC treatment rotor system further comprises: a casing having a chamber and end caps located at both ends of the chamber, the end caps are fixedly arranged, the rotor 10 is rotatably arranged on the casing and partially or completely located within the chamber, the inlet of the first adsorption zone 100 and the outlet of the second adsorption zone 200 are formed on one of the end caps; the outlet of the first adsorption zone 100 and the inlet of the second adsorption zone 200 are formed on the other end cap.

Further, the second desorption zone 400 has two outlets; the outlet of the first desorption zone 300 and two outlets of the second desorption zone 400 are formed on one of the end caps; the inlet of the first desorption zone 300 and the inlet of the second desorption zone 400 are formed on the other end cap.

Specifically, each adsorption zone in this embodiment is an adsorption structure with a specific shape made of adsorbent materials, the outlet and inlet of each adsorption zone mentioned above refer to a channel or through hole that communicates between the adsorption zone and the outside, not the adsorption zone itself has such a port, for example, such a port for fluid circulation is formed by the above-mentioned end cap, and other parts can be closed by the casing; similarly, the outlet and inlet of each desorption zone are the same.

In this embodiment, the rotor 10 is located within the casing and is rotatable along its axis within the chamber of the casing. And by rotating an appropriate angle, for example, rotating 90° or 180°, etc., the first adsorption zone 100 can be rotated to the position where the first desorption zone 300 is located, at this moment, the first adsorption zone 100 can become the first desorption zone 300.

This embodiment further provides a VOC treatment method, which is applied to the above-mentioned VOC treatment rotor system, and the treatment method comprises: making VOC-containing waste gas enter the first adsorption zone 100 through the gas intake pipeline 20 for adsorption treatment by the first adsorption zone 100, then enter the gas outlet main pipe 31, and then enter the second adsorption zone 200 through the gas outlet branch pipe 32 or be discharged through the first clean gas outlet pipe 33;

The gas entering the second adsorption zone 200 is discharged through the second clean gas outlet pipe 50 after being adsorbed by the second adsorption zone 200.

The VOC treatment method in this embodiment has the following beneficial effects as follows: by dividing two adsorption zones on one rotor 10, if the VOC content in the gas after passing through the first adsorption zone 100 still exceeds the preset value, the VOCs can be further adsorbed and removed through the second adsorption zone 200, which can meet the requirements without two independent rotors 10, improve the VOC treating capacity of the entire system, and can remove VOCs in a hierarchical manner, while avoiding the combined installation of a plurality of separate rotors, especially reducing the switching operation between two or even more independent rotors 10.

In this embodiment, making the VOC-containing waste gas enter the first adsorption zone 100 through the gas intake pipeline 20 for adsorption treatment by the first adsorption zone 100, then enter the gas outlet main pipe 31, and then enter the second adsorption zone 200 through the gas outlet branch pipe 32 or be discharged through the first clean gas outlet pipe 33;

Meanwhile, it comprises: detecting the VOC concentration in the gas flowing out of the gas outlet main pipe 31 using the VOC content detection device 40, and if the VOC concentration is less than or equal to the preset value, connecting the gas outlet main pipe 31 to the first clean gas outlet pipe 33 and discharging the gas after adsorption treatment from the first clean gas outlet pipe 33; if the VOC concentration is greater than the preset value, connecting the gas outlet main pipe 31 to the gas outlet branch pipe 32, and discharging the gas after adsorption treatment by the second adsorption zone 200 from the second clean gas outlet pipe 50.

In this embodiment, the VOC treatment method further comprises:

adjusting the rotor 10 to change the first adsorption zone 100 to the first desorption zone 300, and change the second adsorption zone 200 to the second desorption zone 400; the way of adjustment includes, but is not limited to, for example, the way of rotation;

heating the gas flowing through the first desorption zone 300 and the second desorption zone 400 by the heater 600 to perform desorption regeneration on the first desorption zone 300 and the second desorption zone 400;

making part of the gas flow passing through the second desorption zone 400 to pass through the first circulation pipeline 60 which is communicated with the gas intake pipeline 20, so as to be recirculated into the first adsorption zone 100;

making another part of the gas flow passing through the second desorption zone 400 to enter the second concentration pipeline 80;

making the gas flow passing through the first desorption zone 300 to pass through the first concentration pipeline 70 and enter the second concentration pipeline 80;

making the gas flow in the second concentration pipeline 80 to communicate with the catalytic combustion mechanism 500;

performing catalytic combustion of the gas flow through the catalytic combustion mechanism 500.

In this embodiment, the VOC content in the gas treated by the second desorption zone 400 is lower than the VOC content in the polluted gas to be treated, and after circulation through the first circulation pipeline 60, mixing the two can reduce the treating pressure of the first adsorption zone 100 and ensure the adsorption effect on VOCs.

In this embodiment, after performing catalytic combustion of the gas flow through the catalytic combustion mechanism 500, the method further comprises:

circulating the gas flow out of the catalytic combustion mechanism 500 through the second circulation pipeline 90 to enter the heater 600.

As shown in FIG. 1, the second circulation pipeline 90 can circulate part of the gas generated after catalytic combustion into the heater 600, and for the circulation gas flowing out of the catalytic combustion mechanism 500, not only VOCs are basically removed, but also its temperature is relatively high, and it circulates into the first desorption zone 300 and the second desorption zone 400 to regenerate the rotor 10, and the waste heat in the airflow is also reused at the same time, which reduces the burden on the heater 600, reduces the energy consumption of the heater 600, and is conducive to saving energy.

Other operations of the VOC treatment rotor system and the VOC treatment method according to the present embodiment can be understood and easily realized by those skilled in the art, and therefore will not be described in detail.

The embodiments described above are only for illustrating the technical concepts and features of the present disclosure, and are intended to make those skilled in the art being able to understand the present disclosure and thereby implement it, and should not be concluded to limit the protective scope of this disclosure. Any equivalent variations or modifications according to the spirit of the present disclosure should be covered by the protective scope of the present disclosure.

What is claimed is:

1. A VOC treatment rotor system comprising:
   only one rotor, the rotor having a first adsorption zone and a second adsorption zone which are arranged in sequence along the circumferential direction thereof and are independent of each other;
   a gas intake pipeline communicated with an inlet of the first adsorption zone;
   a gas outlet pipeline comprising a gas outlet main pipe, a gas outlet branch pipe and a first clean gas outlet pipe, an inlet of the gas outlet main pipe being communicated with an outlet of the first adsorption zone, an outlet of the gas outlet main pipe being respectively communicated with an inlet of the gas outlet branch pipe and an inlet of the first clean gas outlet pipe;
   an outlet of the gas outlet branch pipe being communicated with an inlet of the second adsorption zone; and
   a second clean gas outlet pipe communicated with an outlet of the second adsorption zone.

2. The VOC treatment rotor system according to claim 1 further comprising a VOC content detection device for detecting the VOC content in the gas flowing through the gas outlet main pipe, wherein the VOC content detection device is arranged on the gas outlet main pipe.

3. The VOC treatment rotor system according to claim 1, wherein the rotor further comprises a first desorption zone arranged along the circumferential direction thereof and in sequence with the second adsorption zone, and a second desorption zone located between the first desorption zone and the first adsorption zone, and the first desorption zone and the second desorption zone are arranged independently of each other.

4. The VOC treatment rotor system according to claim 3, further comprising a heater for heating regeneration gas, and an outlet of the heater is communicated with an inlet of the first desorption zone and an inlet of the second desorption zone, respectively.

5. The VOC treatment rotor system according to claim 4, further comprising:
   a first circulation pipeline, an inlet of the first circulation pipeline being communicated with an outlet of the second desorption zone, and an outlet of the first circulation pipeline being communicated with the gas intake pipeline;
   a first concentration pipeline, an inlet of the first concentration pipeline being communicated with an outlet of the first desorption zone;
   a second concentration pipeline, an outlet of the first concentration pipeline being communicated with the second concentration pipeline;
   an inlet of the second concentration pipeline being communicated with another outlet of the second desorption zone; and
   a catalytic combustion mechanism, an outlet of the second concentration pipeline being communicated with an inlet of the catalytic combustion mechanism.

6. The VOC treatment rotor system according to claim 5, further comprising:
   a second circulation pipeline, an inlet of the second circulation pipeline is communicated with an outlet of the catalytic combustion mechanism, and
   an outlet of the second circulation pipeline is communicated with an inlet of the heater.

7. The VOC treatment rotor system according to claim 1 further comprising
   a casing having a chamber and
   end caps located at both ends of the chamber,
   wherein the rotor is rotatably arranged on the casing and partially or completely located within the chamber.

8. A VOC treatment method, wherein the treatment method is carried out by using a VOC treatment rotor system according to claim 2, and the treatment method comprises:
   making VOC-containing waste gas enter the first adsorption zone through the gas intake pipeline for adsorption treatment by the first adsorption zone;
   then entering the gas outlet main pipe;
   then entering the second adsorption zone through the gas outlet branch pipe or discharging from the first clean gas outlet pipe;
   detecting the VOC content in the gas entering the gas outlet main pipe using the VOC content detection device;
   if the VOC content is less than or equal to the preset value, connecting the gas outlet main pipe to the first clean gas outlet pipe and discharging the gas after adsorption treatment from the first clean gas outlet pipe; and
   if the VOC content is greater than the preset value, connecting the gas outlet main pipe to the gas outlet branch pipe, and discharging the gas after adsorption treatment by the second adsorption zone from the second clean gas outlet pipe.

9. The VOC treatment method according to claim 8, wherein:
   the rotor further comprises a first desorption zone arranged along the circumferential direction thereof and in sequence with the second adsorption zone, and a second desorption zone located between the first desorption zone and the first adsorption zone, and the first desorption zone and the second desorption zone are arranged independently of each other;

the VOC treatment rotor system further comprises:

a heater for heating regeneration gas, an outlet of the heater being communicated with an inlet of the first desorption zone and an inlet of the second desorption zone, respectively;

a first circulation pipeline, an inlet of the first circulation pipeline being communicated with an outlet of the second desorption zone, and an outlet of the first circulation pipeline being communicated with the gas intake pipeline;

a first concentration pipeline, an inlet of the first concentration pipeline being communicated with an outlet of the first desorption zone;

a second concentration pipeline, an outlet of the first concentration pipeline being communicated with the second concentration pipeline; an inlet of the second concentration pipeline being communicated with another outlet of the second desorption zone; and a catalytic combustion mechanism, an outlet of the second concentration pipeline being communicated with an inlet of the catalytic combustion mechanism; and the treatment method further comprises:

adjusting the rotor to change the first adsorption zone to the first desorption zone, and change the second adsorption zone to the second desorption zone;

heating the regeneration gas flowing through the first desorption zone and the second desorption zone by the heater to perform desorption regeneration on the first desorption zone and the second desorption zone;

making part of the gas flow passing through the second desorption zone to pass through the first circulation pipeline which is communicated with the gas intake pipeline, so as to be recirculated into the first adsorption zone;

making another part of the gas flow passing through the second desorption zone to enter the second concentration pipeline;

making the gas flow passing through the first desorption zone to pass through the first concentration pipeline and enter the second concentration pipeline;

making the gas flow in the second concentration pipeline to communicate with the catalytic combustion mechanism; and performing catalytic combustion of the gas flow through the catalytic combustion mechanism.

10. The VOC treatment method according to claim 9, wherein a rotation angle of the rotor is adjusted to be 90°, 180°, 270° or 360°.

11. The VOC treatment method according to claim 9, characterized in that, controlling the desorption operation of the desorption zones of the rotor to be performed while the adsorption zone is performing adsorption.

* * * * *